United States Patent
Thakur

(10) Patent No.: US 7,627,146 B2
(45) Date of Patent: Dec. 1, 2009

(54) METHOD AND APPARATUS FOR EFFECTING AUTOMATIC RED EYE REDUCTION

(75) Inventor: Khageshwar Thakur, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 653 days.

(21) Appl. No.: 10/883,121

(22) Filed: Jun. 30, 2004

(65) Prior Publication Data

US 2006/0017825 A1 Jan. 26, 2006

(51) Int. Cl.
*G06K 9/00* (2006.01)

(52) U.S. Cl. ........................ 382/117; 382/167

(58) Field of Classification Search ................ 382/117, 382/128, 291, 118, 167, 115; 359/463, 464, 359/619, 462, 722, 465; 349/15; 351/44, 351/210, 201, 240, 163, 232; 430/514, 583, 430/503, 504, 505, 567; 348/E13.059, E13.038, 348/E13.033, E13.037, 58, E13.058, E13.04, 348/E13.029, E13.03, E13.031, E13.043, 348/E13.022; 352/86; 353/8
See application file for complete search history.

(56) References Cited

U.S. PATENT DOCUMENTS

| 5,892,837 | A | * | 4/1999 | Luo et al. | 382/117 |
| 5,990,973 | A | * | 11/1999 | Sakamoto | 348/576 |
| 6,016,354 | A | * | 1/2000 | Lin et al. | 382/117 |
| 6,134,339 | A | * | 10/2000 | Luo | 382/115 |
| 2005/0047656 | A1 | * | 3/2005 | Luo et al. | 382/167 |

* cited by examiner

*Primary Examiner*—Sheela C Chawan

(74) *Attorney, Agent, or Firm*—Michael Best & Friedrich

(57) ABSTRACT

A method, and an apparatus employing the method, of reducing red eye effect from image data having image attributes. In some embodiments, the method includes identifying image data with a first image attribute having characteristics of skin pixels, determining a shape of the identified image data having the first image attribute, mapping other image attributes within the determined shape, and determining a red eye presence from the other mapped image attributes.

63 Claims, 11 Drawing Sheets
(4 of 11 Drawing Sheet(s) Filed in Color)

METHOD AND APPARATUS FOR EFFECTING AUTOMATIC RED EYE REDUCTION

CROSS REFERENCES TO RELATED APPLICATIONS

This patent application is related to the U.S. patent application Ser. No. 10/883,119, filed Jun. 30, 2004, entitled "Red Eye Reduction Apparatus and Method" and assigned to the assignee of the present application.

STATEMENT REGARDING FEDERALLY SPONSORED RESEARCH OR DEVELOPMENT

None.

REFERENCE TO SEQUENTIAL LISTING, ETC

None.

BACKGROUND

1. Field of the Invention

The present invention relates to a method of image processing, and in particular, to a method of processing an image having a red eye effect, and to an apparatus employing the method.

2. Description of the Related Art

Red eye effect is a common phenomenon in flash photography. Many methods have been proposed to reduce or remove the red eye effect in an image. For example, a user may be required to manually indicate a location of a red eye region. Thereafter, a computer is configured to find an extent of the red eye region, correct the extent, and color the extent of the red eye region with the rest of the image.

SUMMARY OF THE INVENTION

The present invention is an automated red eye correction method. In some embodiments, the automated red eye correction method can find red eye effects in an image, and can correct the red eye effects without user intervention. For example, at a high level, the invention can use a search scheme that includes a plurality of sequential steps. These steps can include the acts of finding skin tones of an image, finding candidate regions such as faces of the image based on the found skin tones, and finding red eye regions based on the candidate regions. Starting with data from the entire image, the searching scheme can locate and narrow an area of search down with each step. In some embodiments, combinations of search steps and techniques are used to maximize a success rate.

For example, in some embodiments, the invention provides a method of reducing red eye effect from an image that has image pixel data. The method can include the acts of comparing the image pixel data with data from a skin tone pixel class, and identifying the image pixel data based upon a match between the image pixel data and the data from the skin tone pixel class. The method can include the acts of forming a shape of the identified image pixels, locating at least one pixel that has a pixel attribute in the formed shape, comparing data of the located pixels with data from a red eye map class; and locating a red eye based on a match between the image data of the located pixels and the data from the red eye map class.

In some embodiments, the invention provides a method of reducing red eye effect from image data having image attributes, including the acts of identifying image data with image attributes that are characteristics of skin pixels, and determining a shape of the identified image data that has characteristics of the skin pixels. The method can also include the acts of mapped pixel attributes within the determined shape, and determining a red eye presence from the mapped pixel attributes.

Some embodiments of the present invention provide a red eye reduction system adapted to reduce a red eye effect of an image, including a skin tone identifier that identifies image data with image attributes characteristics of skin pixels, a shape identifier coupled to the skin tone identifier and adapted to determine a shape of the identified image pixel data having characteristics of the skin pixels. A mapping module coupled to the shape identifier and adapted to map pixel attributes within the determined shape, and a red eye detector coupled to the mapping module, and adapted to determine a red eye presence from the mapped image attributes.

Other features and advantages of the invention will become apparent to those skilled in the art upon review of the following detailed description, claims, and drawings.

BRIEF DESCRIPTION OF THE DRAWINGS

The patent or application file contains at least one drawing executed in color. Copies of the patent or patent application publication with color drawings(s) will be provided by the Office upon request and payment of the necessary fee.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. In addition, the terms "connected" and "coupled" and variations thereof are not restricted to physical or mechanical connections or couplings.

Figure 1:
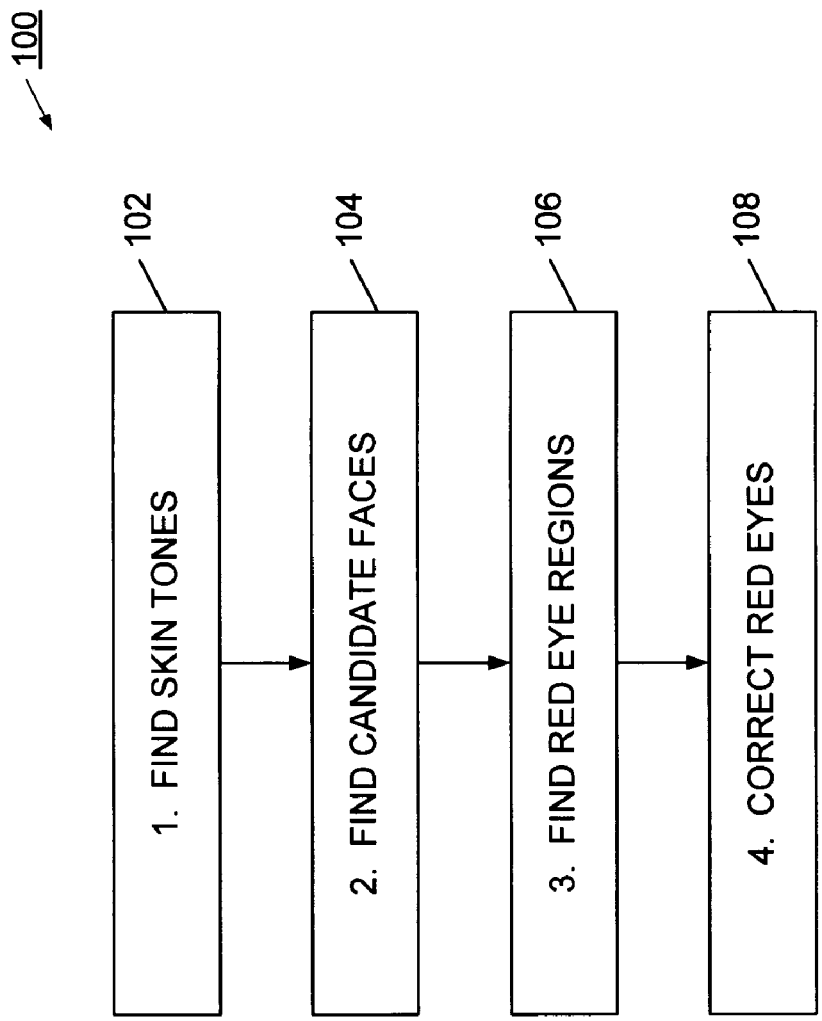
FIG. 1 shows an overview flow chart of an embodiment of the invention.

FIG. 1 shows an overview flow chart of a method 100 according to an embodiment of the invention. At block 102, the method 100 finds pixels that have characteristics of skin tones. After pixels that have characteristics of skin tones have been detected, the method 100 is configured to find candidate faces from the detected pixels at block 104. Thereafter, the method 100 proceeds to find a red eye region from the candidate faces at block 106, and corrects the red eyes at block 108. Details of these blocks are discussed hereinafter.

Some embodiments of the present invention use a database of skin tones. After an image has been acquired, each of the pixel data of the image is compared to the data stored in the skin tone database. When there is a match between the pixel data and the data stored in the skin tone database, or that the pixel data falls within a skin tone boundary set by the skin tone database, the pixel data is classified or identified as skin tone pixel data.

Figure 2:
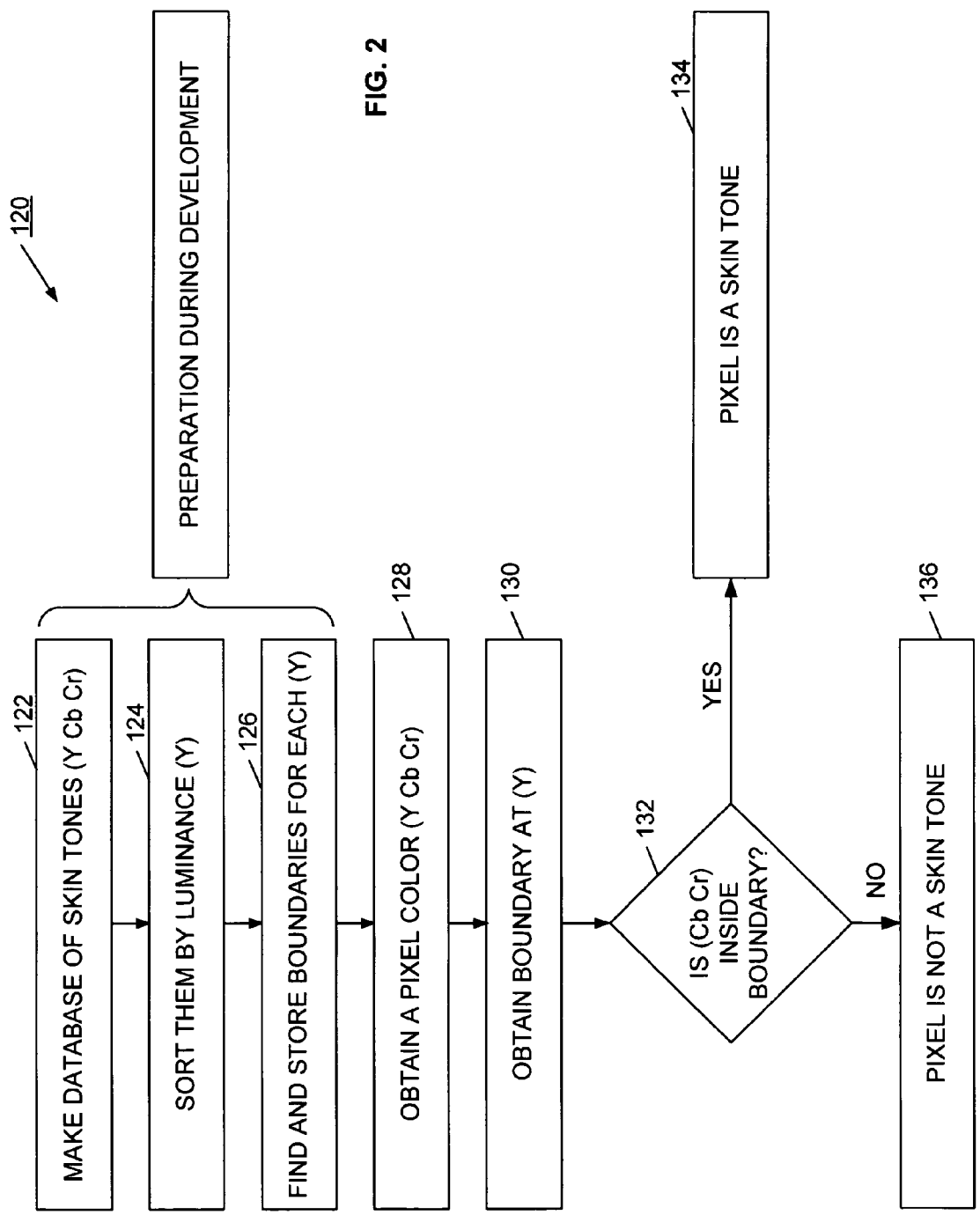
FIG. 2 shows a skin tone detection flow chart according to an embodiment of the invention.

FIG. 2 shows a flow chart of a skin tone detection scheme 120 according to an embodiment of the invention. At block 122, a skin tone database is constructed. Specifically, to construct the skin tone database in some embodiments, known skin tone pixels from a plurality of images are collected or handpicked. The images can be representative of a vast number of people, races, and skin colors or subset thereof. The skin tone database can also or instead be constructed by selecting any number of ranges of colors to be identified as skin tones.

Skin tones collected from the images (or in any other manner) can be sorted by image attribute or color space (e.g., sorted by luminance as shown in the illustrated embodiment at block 124). As a result, the sorted skin tone based on color space provides a plurality of efficient lookup tables. Although luminance of a Y-Cb-Cr color space is used in the embodiment of FIG. 2, any other color spaces such as RGB, Lab, HSV, and the like can be used as desired. Specifically, a (Cb, Cr) pair set corresponding to each Y value can be stored in a table or other form indexed by Y value. For each Y value, all (Cb, Cr) pair sets can be plotted. A (Cb, Cr) pair boundary for each Y value can thereafter be developed. The vertices of the boundary for each Y value can thus be stored in a table (or in any other format) of the skin tone database at block 126.

To find or search whether a pixel is skin color, the skin tone detection scheme 120 of the illustrated embodiment can initially convert the pixel color to a Y-Cb-Cr color space equivalent at block 128. The skin tone detection scheme 120 then extracts the Y index of the pixel of the image, and compares it to the Y indices of the skin tone database. When there is a match between the extracted Y index and a Y index of the skin tone database, the skin tone detection scheme 120 can compare the extracted (Cb, Cr) pair with the corresponding (Cb, Cr) pair set in the database at block 130. More particularly, the skin tone detection scheme 120 can check to determine if the extracted (Cb, Cr) pair falls within the (Cb, Cr) pair boundary set of the Y index at block 132. If the (Cb, Cr) pair is inside the (Cb, Cr) pair boundary set, the pixel is considered or labeled as a skin tone pixel at block 134. Otherwise, the pixel is considered or labeled as a non-skin tone pixel at block 136.

Figure 3:
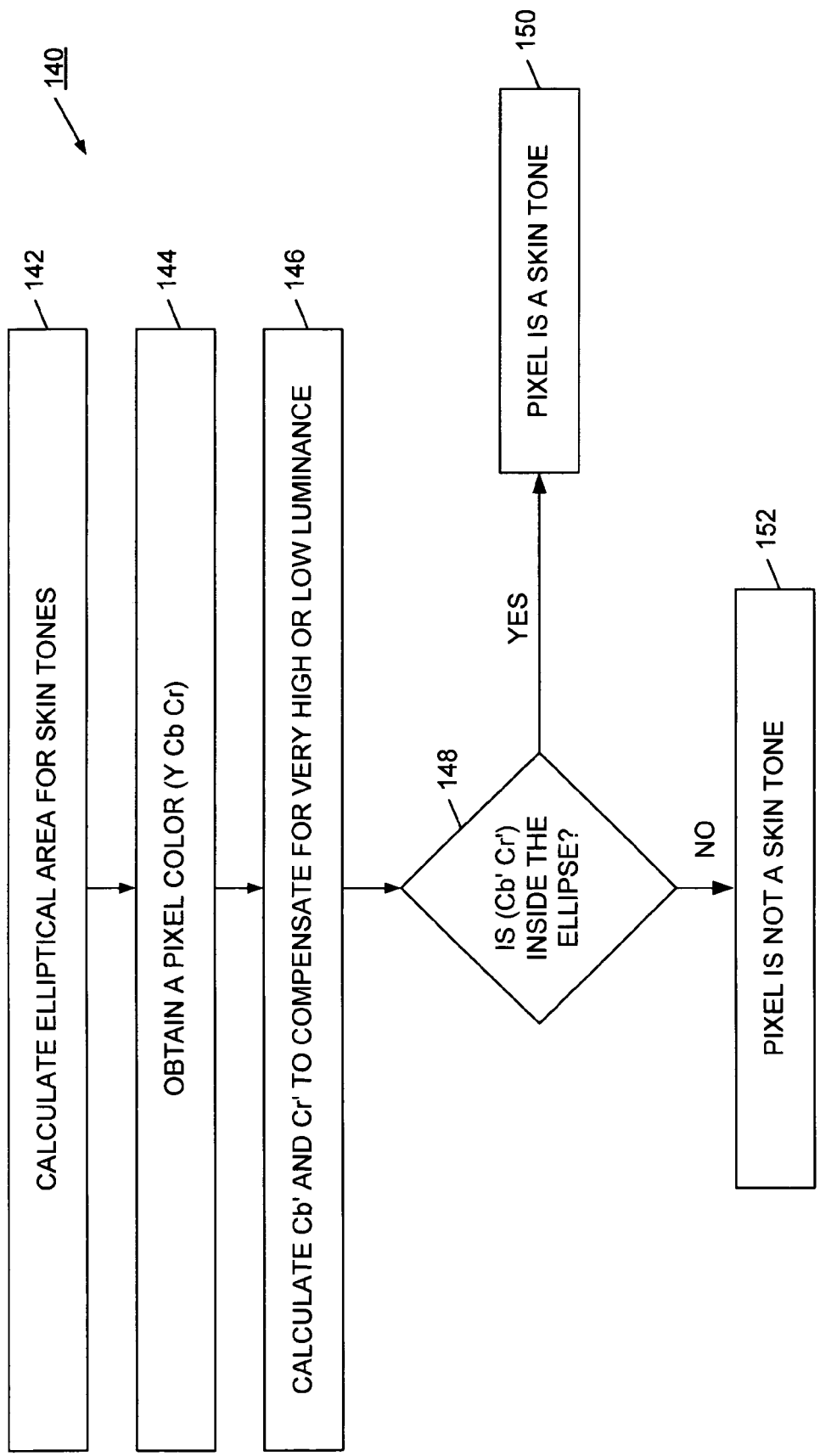
FIG. 3 shows a second skin tone detection scheme according to an embodiment of the invention.
Figure 3B:
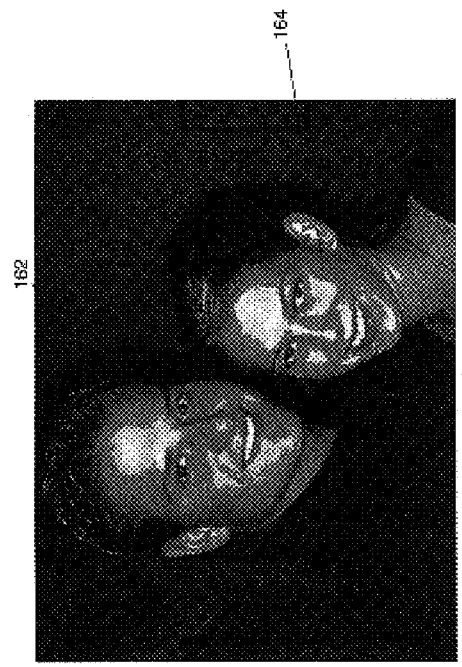
FIG. 3B shows a plurality of skin tone pixels detected by the skin tone detection scheme from the image of FIG. 3A.
Figure 3A:
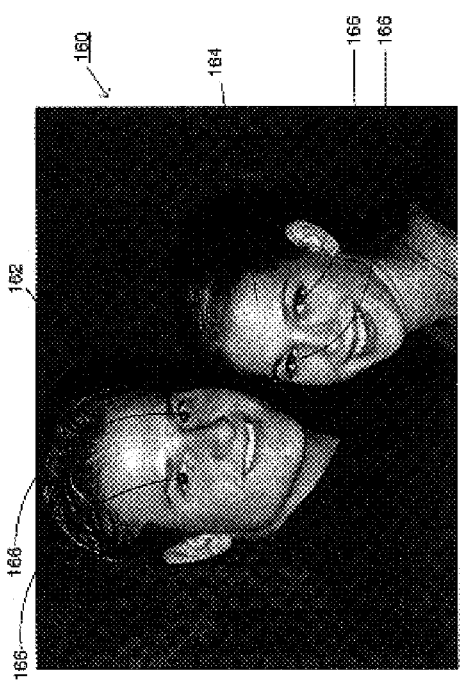
FIG. 3A shows an exemplary image including two faces and having red eye effects.

Of course, other techniques of determining whether an image pixel is a skin tone pixel can also be used. For example, in another embodiment as shown in FIG. 3, a second skin tone detection scheme 140 initially assumes that an ellipse represents all skin tones. Specifically, the skin tone detection scheme 140 illustrated in FIG. 3 calculates an elliptical area for skin tones at block 142, similar to the boundary established in FIG. 2. That is, the elliptical area will therefore represent all skin tones for all luminance values. In this way, determining if a point is inside the ellipse consumes less time than determining if the same point is inside a boundary as discussed earlier, and shown in FIG. 2. However, since one elliptical area is used for all luminance values, the (Cb, Cr) pairs of the elliptical area are generally compensated for low and high luminance values. Specifically, the second skin tone detection scheme 140 can obtain pixel attributes such as color of the pixel, using a Y-Cb-Cr color space at block 144. Depending on the luminance obtained, the (Cb, Cr) pair is compensated for luminance at block 146 to obtain a (Cb', Cr') pair. In this way, a bias due to lighting color can be eliminated, thereby enabling normalization of colors so that such colors can be shown or determined without such bias. Thereafter, the second skin tone detection scheme 140 of FIG. 3 determines if the transformed (Cb', Cr') pair is in the generated ellipse at block 148. If the (Cb', Cr') pair is inside the ellipse set, the pixel is considered or labeled as a skin tone pixel at block 150. Otherwise, the pixel is considered or labeled as a non-skin tone pixel at block 152. For a relatively high-resolution image, in some embodiments only portions of all the skin pixels are located. Therefore, some pixels can be bypassed or skipped depending on the resolution of the image. For example, in some embodiments every other pixel can be bypassed for a 100-200 dpi image. As another example, in some embodiments every third pixel can be located for a 200-300 dpi image. FIG. 3A shows an image 160 having two faces 162, 164. Each of the faces 162, 164 has a pair of eyes 166 reacting to a flash and thus having red eye effects. FIG. 3B shows a plurality of skin tone pixels (highlighted in magenta) detected by the skin tone detection scheme 140 from the image 160 of FIG. 3A.

Once the skin tone pixels have been detected such as by using one of the skin tone detection schemes 120, 140 (described above) some of the embodiments of the red eye reduction method according to the present invention determine a shape of the identified image data having characteristics of the skin pixels at block 104 of FIG. 1. Exemplary determined shapes can include hands, faces, feet, necks, and the like, some of which (i.e., face shapes) include eyes.

Figure 3D:
FIG. 3D shows a plurality of solidified regions of the connected groups in FIG. 3C.
Figure 3C:
FIG. 3C shows a plurality of detected connected regions represented by different shading colors.
Figure 4:
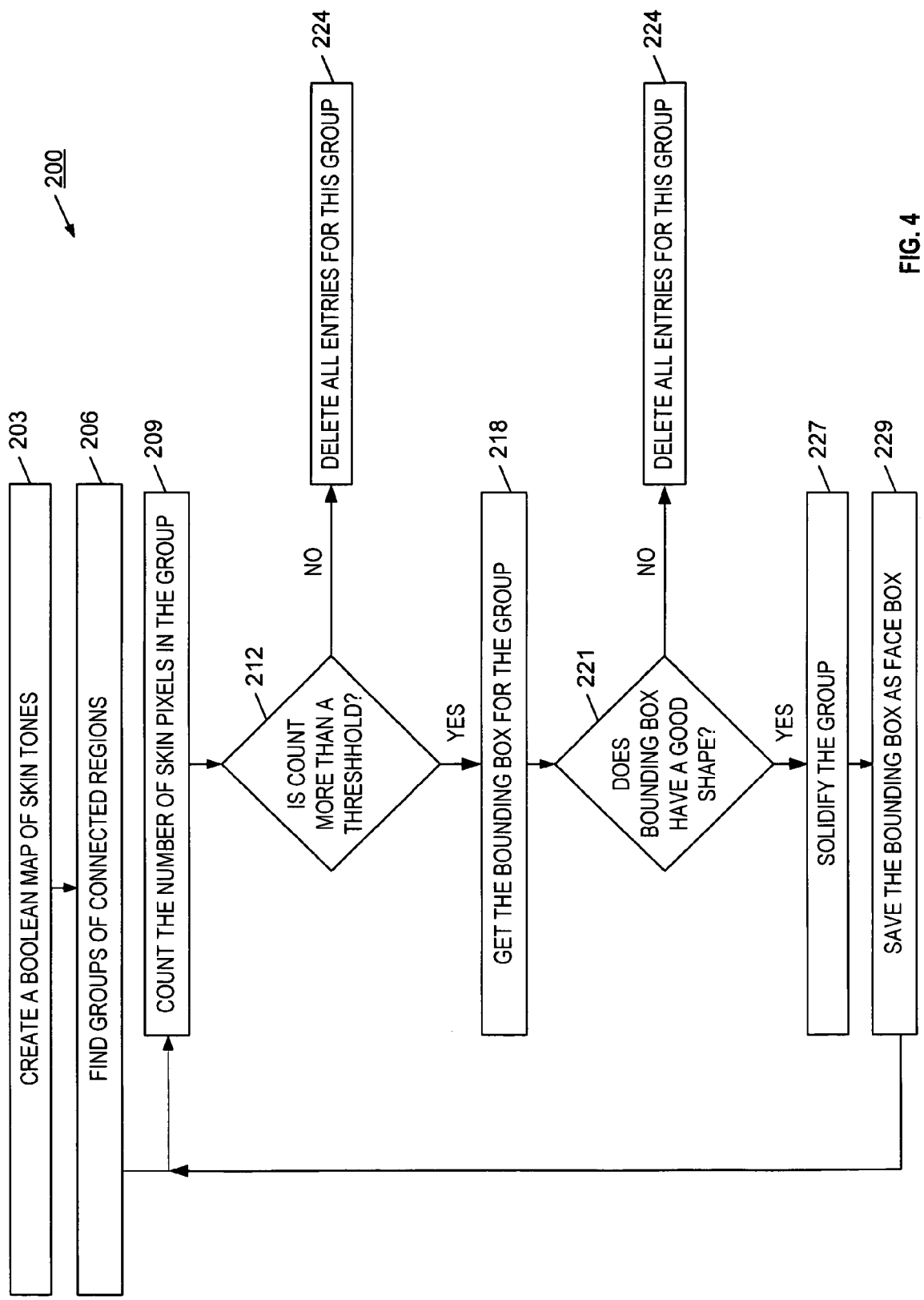
FIG. 4 shows a flow chart of a shape identification scheme according to an embodiment of the invention.

FIG. 4 shows a flow chart of a shape identification scheme 200 according to an embodiment of the invention. Skin tone pixels of an image, (e.g., those detected in the previous detection scheme or otherwise identified in any other manner) can be stored in a buffer at block 203. In some embodiments, the storing buffer can be a Boolean buffer that has the same size as the original image. Each entry in the Boolean buffer has a true/false value indicating whether the corresponding pixel in the image is a skin tone pixel. Due to noise, image defects (e.g., photo overexposure), or other causes incorrectly identified pixels are possible. To filter out incorrect skin pixel determinations, the method in the embodiment of FIG. 4 can isolate groups of connected pixels determined to be skin tone pixels, such as groups of 4 or 8-connected pixels at block 206. FIG. 3C shows a plurality of detected connected regions 168, 170 represented by different shading colors obtained at block 206. The number of connected skin tone pixels in each connected skin tone pixel group is counted at block 209. At block 212 the count is compared with an empirically determined threshold. If the number falls below the threshold at block 212, the entire connected group can be considered spurious and thus be deleted from the buffer at block 225. Otherwise, the group of connected pixels is further analyzed.

Figure 3E:
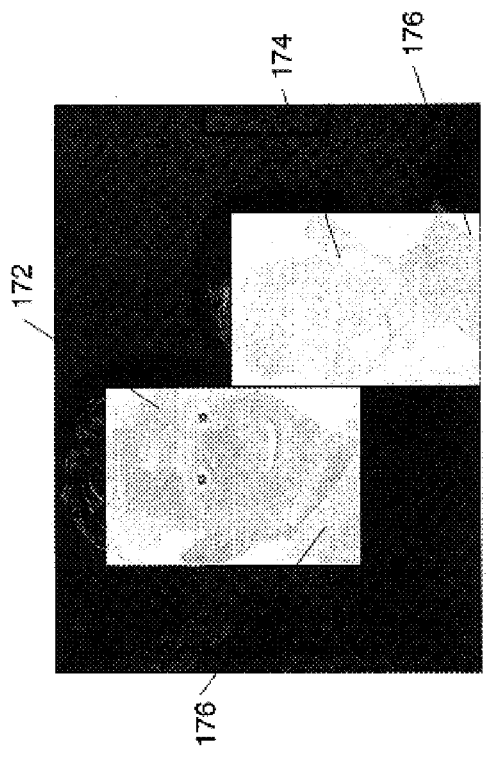
FIG. 3E shows a plurality of face boxes for the solidified regions of FIG. 3D.

In some embodiments, once the connected group of skin tone pixels has a minimum number of connected skin tone pixels to exceed the threshold, a bounding box of the connected group is obtained at block 218 to include all the connected groups. Each bounding box has a shape. Therefore, the bounding boxes will have many different shapes. However, a typical face will have a bounding box that is mostly rectangular in shape with its height being about twice its width, or is a square. The shape of the bounding box is examined at block 221. Particularly, a badly shaped bounding box is considered as non-candidate groups and is deleted from the storing buffer at block 224. For example, a bounding box with its width being four times its height is considered unlikely to contain a face, and therefore, the bounding box is considered a badly shaped bounding box. As a result, the pixels in the bounding box are eliminated from further analysis. Otherwise, the bounding box of connected groups can be considered to have an acceptable shape, and therefore merits further analysis. As a result, the bounding boxes of the remaining connected groups or regions of skin tone pixels can be passed on as candidate shapes or faces, or simply face boxes. There can be many face boxes in an image. For each face box, the gaps left by incorrect skin pixel determinations or enclosed by connected groups are filled or solidified as skin tone pixels at block 227. FIG. 3D shows a plurality of solidified regions 168', 170' of the connected groups obtained at block 227 for the image 160. At block 229, the bounding box is saved as a face box. FIG. 3E shows a plurality of face boxes 172, 174 obtained at block 229 for the solidified regions 168', 170' of the image 160. The process continues until all the groups have been examined. In some embodiments, the shape identification scheme 200 can develop a rectangular face box that encompasses an entire face. Thereafter, pixels inside the rectangular face identified as skin tone pixels can be filled or solidified.

Optionally, in some embodiments, the shape identification scheme 200 can find a plurality of edges in an image and can store the edge pixels as non-skin pixels in the buffer. These edges can be identified after a skin tone pixel detection process (such as those described above), or after finding connected skin tone pixel groups (as also described above). In this way, different body parts can be separated. For example, in some cases, face pixels and shoulder pixels will appear connected since they can have the same color. However, marking the edge pixels of chin as non-skin pixels can open up a gap between a face and a shoulder in an image. As a result, the shape identification scheme 200 will have a smaller or reduced number of search areas to examine. Edge detection can be performed by any number of standard algorithms, such as by using a Canny edge detector or Shen-Castan edge detector. If desired, pixels can be skipped or bypassed in this step, such as for high-resolution images as described earlier.

Figure 5:
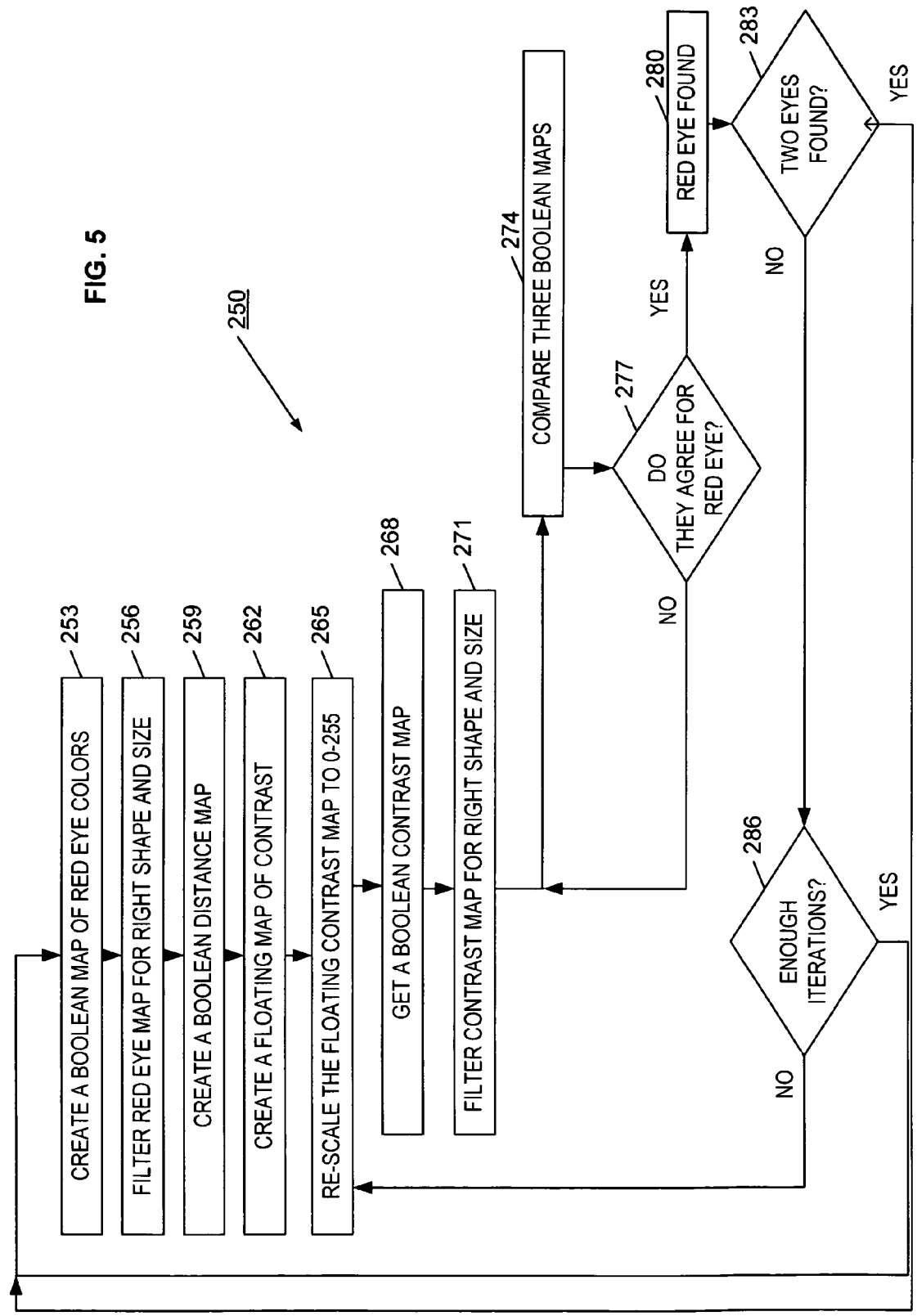
FIG. 5 shows a red eye mapping scheme according to an embodiment of the invention.

A red eye mapping scheme 250 according to an embodiment of the present invention is shown in FIG. 5, and can be used to map different pixel attributes to determine or find a red eye region. This process can be used in conjunction with the shape identification scheme 200 described above, such as after a candidate shape has been determined in some embodiments, it is assumed that an eye has a white portion on at least one side of an iris circle, that the eye has at least a few red eye pixels, and/or that the eye has a relatively higher contrast when compared to skin tone pixels. In the embodiment of FIG. 5, three types of attribute maps are used in determining if a red eye is present in an image. However, any other number of maps can also be used to determine the presence of a red eye.

In some embodiments, the red eye mapping scheme 250 first creates for all face boxes a Boolean map of red eye colors in the image at block 253. To use the red eye map, a red eye database can be made for red eye colors. Similar to the manner of skin tone detection described above with reference to FIG. 2, a red eye database can be constructed from known red eye pixels from a plurality of images collected or handpicked, or by selecting such colors in any other manner. Images can be representative of a number of people, races, and skin colors or any subject thereof.

Red eyes collected from the images can be sorted by image attribute or color space (e.g., sorted by luminance). As a result, the sorted red eyes based on color space can provide a plurality of efficient lookup tables. Although luminance of a Y-Cb-Cr color space is used in the embodiment of FIG. 5, any other color spaces such as RGB, Lab, HSV, and the like can be used as desired. Specifically, a (Cb, Cr) pair set corresponding to each Y value can be stored in a table or other form indexed by Y value. For each Y value, all (Cb, Cr) pair sets can be plotted. A (Cb, Cr) pair boundary for each Y value can thereafter be developed. The vertices of the boundary for each Y value can thus be stored in a table (or in any other format) of the red eye database.

To find or search whether a pixel is red eye pixel, the method illustrated in FIG. 5 can initially convert the pixel color to a Y-Cb-Cr color space equivalent. The red eye mapping scheme 250 can then extract the Y index of the pixel of the image, and compare it to the Y indices of the red eye database. When there is a match between the extracted Y index and a Y index of the red eye database, the red eye mapping 250 scheme can compare the extracted (Cb, Cr) pair with the corresponding (Cb, Cr) pair set in the database. More particularly, the red eye mapping scheme 250 can check to determine if the extracted (Cb, Cr) pair falls within the (Cb, Cr) pair boundary set of the Y index. If the (Cb, Cr) pair is inside the (Cb, Cr) pair boundary set, the pixel is considered a red eye pixel. Thereafter, the red eye mapping scheme 250 can filter the red eye map for a right shape and a right size at block 256, in a manner similar to deleting the badly shaped bounding boxes at block 221 as discussed earlier. For example, if a rectangular shaped red eye region is unlikely to contain a red eye, and therefore considered a non-red eye candidate. The remaining red eye regions are then considered red eye candidates. The non-red eye candidates are then deleted, whereas the red eye candidates are kept for further analysis.

Figure 3F:
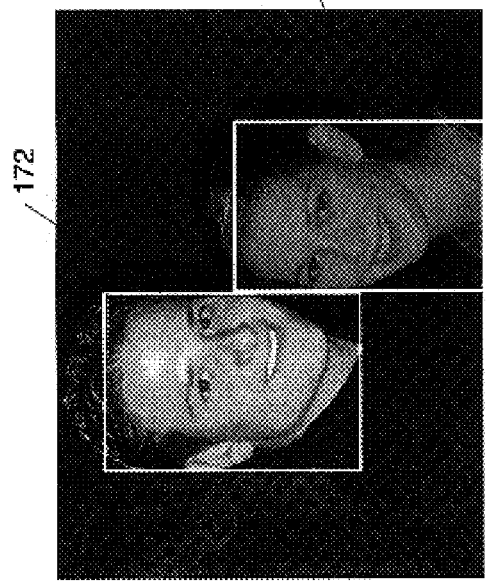
FIG. 3F shows an exemplary distance map obtained from the face boxes.
Figure 3G:
FIG. 3G shows an exemplary equalized distance map obtained from the distance map.
Figure 3H:
FIG. 3H shows an exemplary distance map obtained from the equalized distance map after thresholding.

In some embodiments, the red eye mapping scheme 250 uses a distance map to locate or to find at least one white eye portion in an image (e.g., in a candidate face box described above). For example, the red eye mapping scheme 250 in the embodiment of FIG. 5 can create a Boolean distance map at block 259. FIG. 3F shows an exemplary distance map 176 obtained from the face boxes 172, 174. Specifically, the red eye mapping scheme 250 can store a distance from a neutral color for each pixel. If a pixel has a high luminance value or has a color space distance relatively distant from the neutral color, the pixel can be generally considered white. A distance can be determined by calculating a standard deviation between red, green and blue components of the pixel. In many cases, distances thus found remain in a relatively narrow band and can be difficult to distinguish from one another. Therefore, in some embodiments the red eye mapping scheme 250 applies histogram equalization on the distance map in a manner known in the art. Equalized distances can then be compared with a predetermined high threshold value, to create a Boolean map carrying true/false values. For example, any pixel having an equalized distance above 200 can be considered white and made true in the distance map, while others can be labeled false. FIG. 3G shows an exemplary equalized distance map 178 obtained from the distance map 176. Comparing the luminance values of the pixels can further reduce the number of pixels in the distance map to be analyzed. For example, if the luminance of a pixel is less than a threshold of 200, the pixel can be considered a non-white color, and the corresponding entry from the distance map can be deleted. FIG. 3H shows an exemplary distance map 180 obtained from the equalized distance map 176 after thresholding at block 259.

Figure 3I:
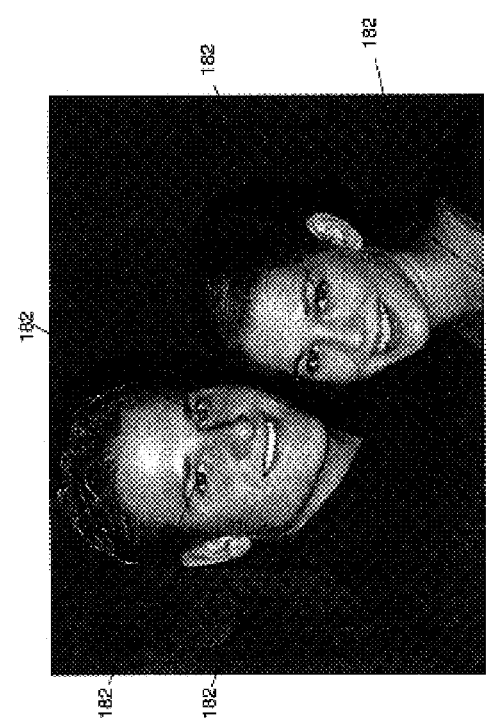
FIG. 3I shows a plurality of red eye pixels determined in the face boxes.
Figure 3J:
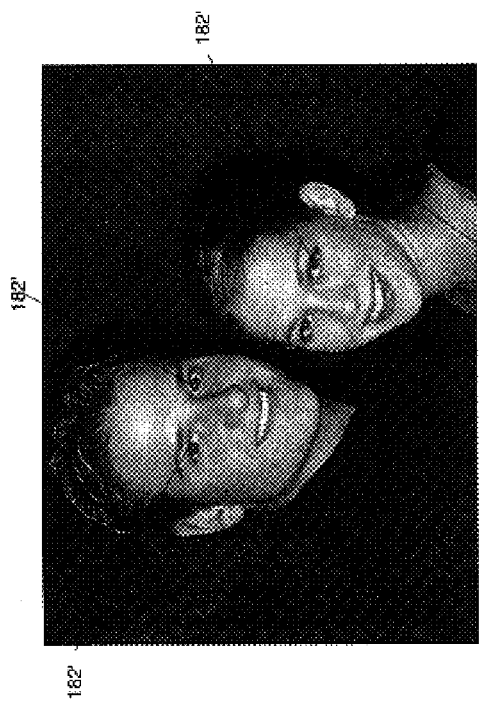
FIG. 3J shows a plurality of opened red eye pixels after two iterations of erosion and dilation.

In operation, the red eye mapping scheme 250 can determine whether a pixel is a red eye pixel for each pixel in a set of pixels (e.g., in the face box as described above). The true/false results can be stored in a red eye map that generally has the same size as the face box. FIG. 3I shows a plurality of red eye pixels 182 determined in the face boxes 180. A few passes of erosion followed by dilation can be performed on the red eye map. The image processing technique of erosion followed by dilation is known as opening and creates or opens up a plurality of small gaps between connected groups or regions. Connected regions can thus be located, and thereafter a decision can be made regarding whether the pixels therein belong to a red eye. The red eye mapping can be based at least in part on the number of pixels in the region or group, and the shape of the bounding box (if used). Unlikely candidates can be deleted from the red eye map. FIG. 3J shows a plurality of opened red eye pixels 182' after two passes or iterations of erosion and dilation.

Figure 3K:
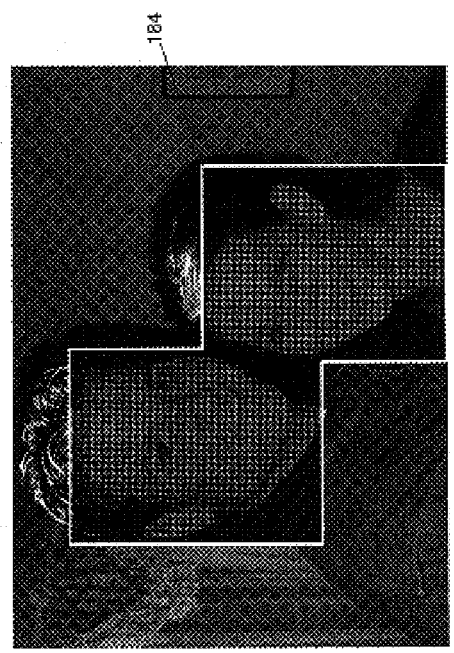
FIG. 3K shows a floating-point contrast map during the first iteration of a red eye mapping scheme.
Figure 3L:
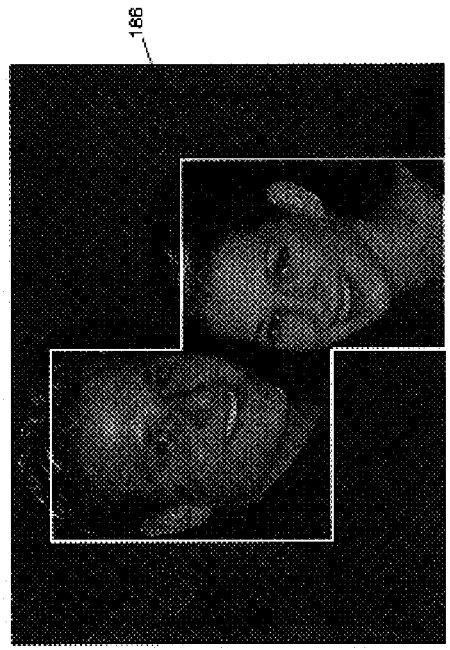
FIG. 3L shows a normalized contrast map during a first iteration of the red eye mapping scheme.
Figure 3N:
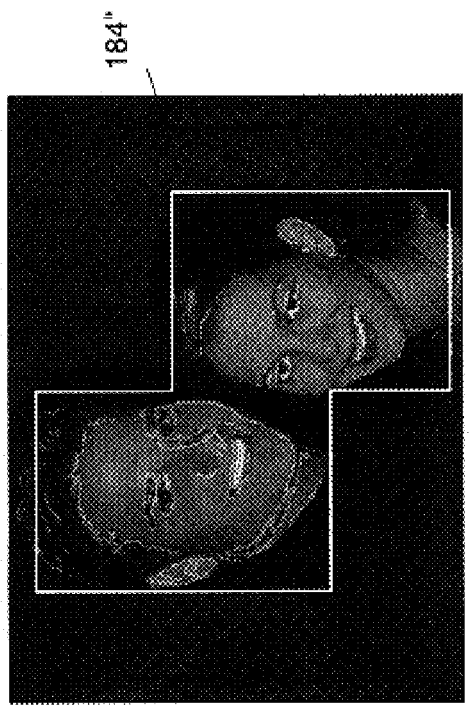
FIG. 3N shows a normalized contrast map during a fifth iteration of the red eye mapping scheme.
Figure 3M:
FIG. 3M shows a normalized contrast map during a second iteration of the red eye mapping scheme.

Some embodiments of the present invention use a contrast map to determine the contrast in the pixels being examined. This contrast map (created at block 262 in the embodiment of FIG. 5) can again use gray scale dilation and erosion to construct a contrast map of a candidate face or facial area with floating-point values. Since contrast map values can vary from face to face, the contrast map can be scaled or normalized. For example, in the embodiment of FIG. 5, the contrast map is normalized to between 0 and 255 for each face at block 265. It is also contemplated that pixels can be bypassed or skipped if needed. FIG. 3K shows a floating-point contrast map 184 during the first iteration of the red eye mapping scheme 250. Similarly, FIGS. 3L, 3M, and 3N show a plurality of normalized contrast maps 184, 184', 184" during a first, a second, and a fifth iteration of the red eye mapping scheme 250, respectively.

In general, the decision regarding whether a red eye has been detected by the red eye mapping scheme 250 can require several passes or iterations of the red eye mapping scheme 250. For example, in the embodiment of FIG. 5, the red eye mapping scheme 250 starts with making a Boolean contrast map from the contrast map with floating-point values at block 268, and filters the contrast map for a right shape and a right size at block 271 in a similar manner as described earlier. More specifically, if a floating-point contrast value is more than a threshold value, the corresponding entry in the Boolean contrast map can be labeled true. Otherwise, the entry in the Boolean contrast map is labeled false. Depending on the resolution of the image, some pixels can be bypassed to enhance the speeds of the mapping scheme 250.

In some embodiments, connected regions in the Boolean contrast map of the red eye mapping scheme 250 are located. Based at least in part on the shape and size of the regions, the mapping scheme 250 can determine whether the region is a viable red eye candidate at block 274. Unlikely candidates can be deleted. For each candidate region, the mapping scheme 250 references the red eye map, the distance map, and the contrast map. If all three maps agree on the candidacy at block 277, the region can be considered red eye at block 280. If less than all three maps agree on the candidacy at 277, another region is then examined, and therefore, block 274 is repeated. In other embodiments, less than all maps need to agree for a determination that a red eye has been found. After the red eye mapping scheme 250 determines that an red eye has found at block 280, and if the mapping scheme 250 identifies two eyes for a face at block 283, the mapping scheme 250 can be run again for other faces detected in an image starting at block 253. Otherwise, if less than two eyes are found, the mapping scheme 250 can re-scale the floating-point contrast map so that the mid point contrast of 127 now maps to end point contrast 255 at block 265 if a pre-determined number of iterations has not yet been performed as determined at block 286. If the pre-determined number of iterations has been performed as determined at block 286, another face box of the image is examined starting at block 253. After a predefined number of iterations, the process can stop even if the red eye mapping scheme 250 does not find a red eye.

Figure 3O:
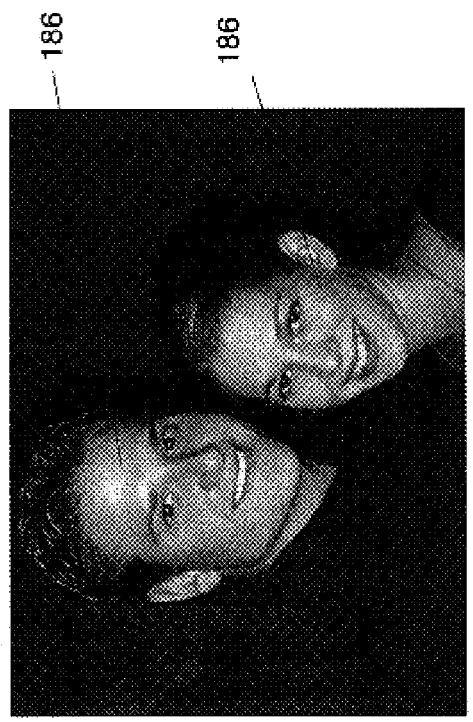
FIG. 3O shows a finished image with the red eye effect removed from the original image of FIG. 3A.
Figure 6:
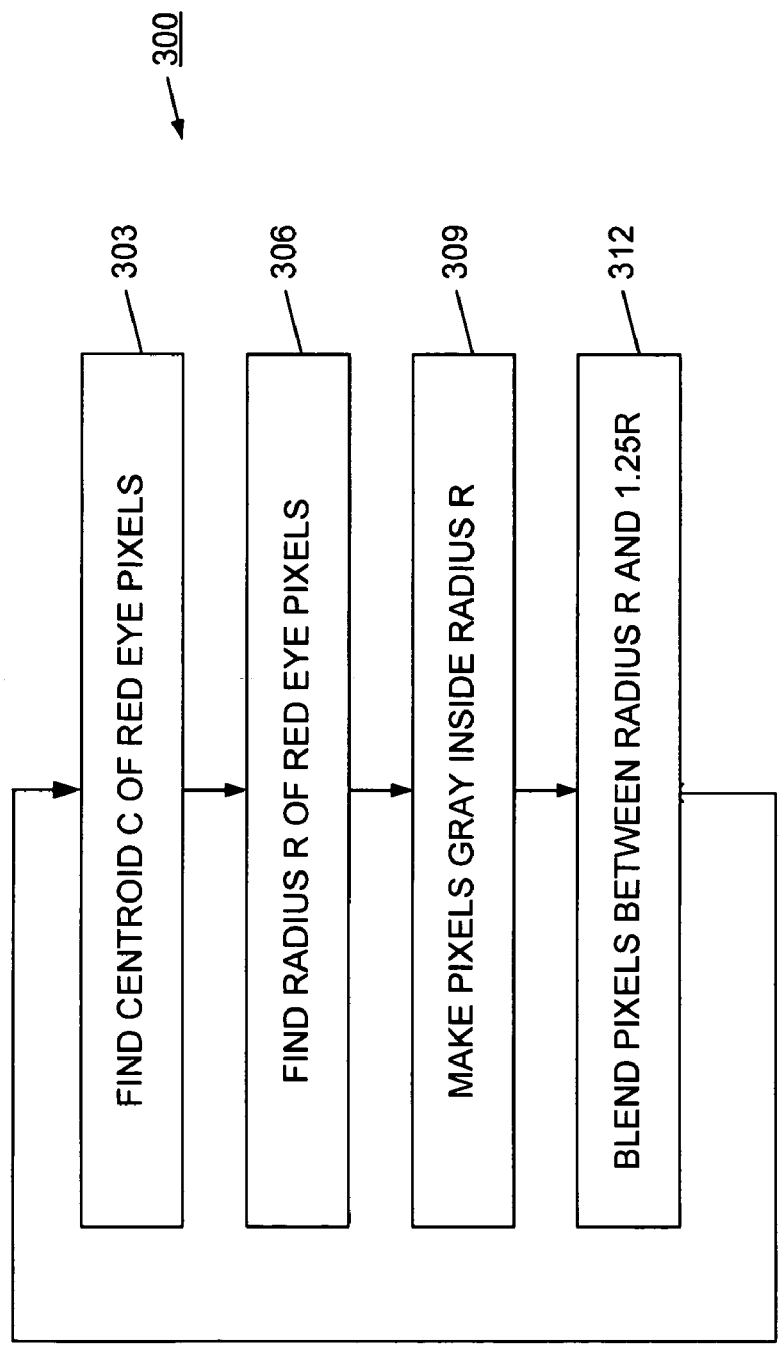
FIG. 6 shows a flow chart of a red eye reduction process according to an embodiment of the invention.

After a red eye has been detected, the red eye effect can be removed. FIG. 6 shows a flow chart of a red eye reduction process 300 according to an embodiment of the present invention. Specifically, once a red eye region has been located, such as by a mapping scheme 250, as described above, the red eye reduction process 300 can calculate a centroid of the red eye pixels as a center of the red eye at block 303. A radius of the red eye can be calculated from the number of red eye pixels found in the region at block 306. For example, if the number of red eye pixels is N, the radius R is given by: R=square root of ($N/\pi$), where, $\pi$=3.14159. The color of pixels inside the radius R can be converted to another color, such as gray at block 309. Red eye effect correction can be made for the identified region using any coloring technique at block 312 for pixels outside the radius and an extended radius, if desired. FIG. 3O shows a finished image 186 with the red eye effect removed from the original image 160 (FIG. 3A).

Figure 7:
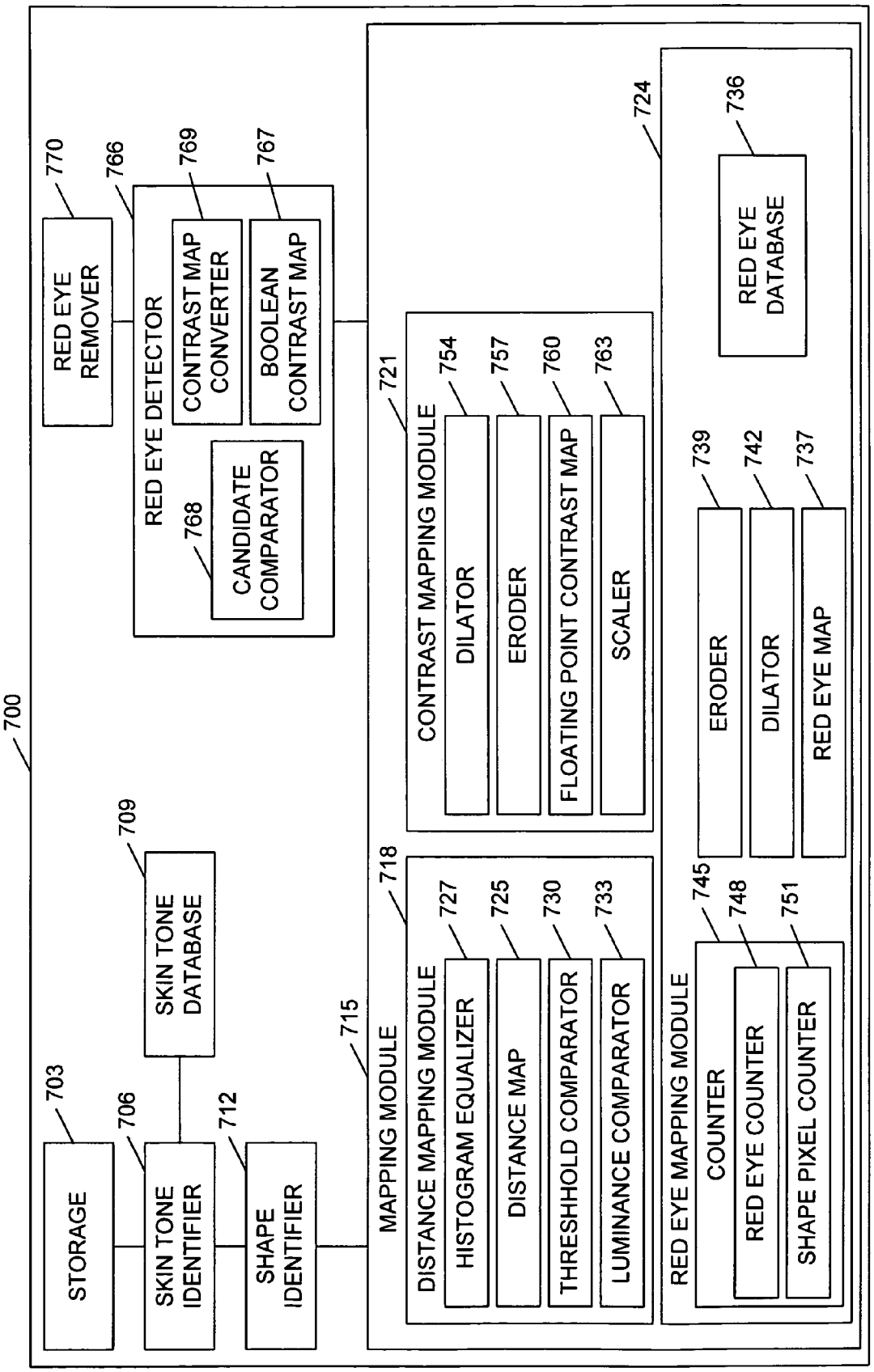
FIG. 7 shows a red eye reduction system according to an embodiment of the invention.

FIG. 7 shows a red eye reduction system 700 according to an embodiment of the present invention. The red eye reduction system 700 can include an image storage component 703 such as a memory, a disk, a buffer, and the like, that stores image data of an image. A skin tone identifier 706 can retrieve the image data from the connected image storage component 703 to identify image data having characteristics of skin pixels. For example, as described earlier, the image data can be compared with data in a skin tone database 709. Although the storage component 703 and the skin tone database 709 are shown to be individual components, they can instead be part of a larger memory structure. Once pixels having characteristics of skin tone have been detected, a shape identifier 712 can be used to identify from the detected skin tone pixels an appropriate candidate shape, or a candidate face for further analysis. The shape identifier 712 can identify a shape that can include a red eye as described above with reference to FIG. 4. Once the shape has been identified, pixels of the identified shape can be fed to a mapping module 715.

In general, the mapping module 715 can map image attributes of the identified pixels to identify some facial components or features, such as an eye, a white portion of an eye, an iris of an eye, wrinkles, a nose, a pimple, a mouth, teeth in a mouth, and the like. The mapping module 715 can include a distance mapping module 718, a contrast mapping module 721, and/or a red eye mapping module 724. The distance mapping module 718 can be configured to find a white portion of an eye. For example, for each shape, face box or other region identified, the distance mapping module 718 can generate a distance map 725. In the distance map 725, the distance mapping module 718 can store a color space distance from a neutral color for each pixel. For example, if a pixel has a high luminance value and is relatively close to a neutral color, the image data or the corresponding pixel can be considered white. In some embodiments, the color distance is determined by calculating the standard deviation between red, green and blue components of the pixel. Since distances found using the distance mapping module 718 can fall within a relatively narrow band, and can be generally difficult to distinguish from one another, a histogram equalizer 727 can be used to equalize or normalize the distances stored in the distance map 725. Equalized or normalized distances can then be compared to a threshold comparator 730 with a pre-determined high threshold. Thus, the distance map 725 can be transformed to a Boolean distance map carrying true or false values. For example, any pixel having a distance above a particular value can be considered white and made true in the Boolean distance map, while other pixels having distances less than the value can be labeled false. Comparing the luminance values of the pixels in a luminance comparator 733 can further reduce the distance map. For example, if the luminance of a pixel is less than a threshold value, the luminance comparator 733 can label the pixel as being not white. The corresponding distance in the distance map 725 can therefore be removed.

The red eye mapping module 724 can include a red eye database 736 which can be generated as described earlier. At run time, for each pixel in face box or other region, the red eye mapping module 724 can determine whether the pixel is a red eye pixel. In some embodiments, true or false results are stored in a red eye map 737. A few iterations or passes of erosion followed by dilation can also be performed on the red eye map 737 with an eroder 739 and a dilator 742. The process of erosion followed by dilation can be used to open up small gaps between touching regions or groups. Thus, the red eye mapping module 724 can find connected regions, and/or can decide whether the connected regions belong to a red eye, such as by using a counter 745. The counter 745 can include a shape pixel counter 751 and/or a red eye pixel counter 748, which output a number pixels in the candidate face shape and a number of red eye pixels found in the shape, respectively. Unlikely candidates can be deleted from the red eye map 737 when the number of connected red eye pixels is greater than a pre-determined threshold, for example.

The contrast mapping module 721 can include a gray scale dilator 754 and a gray scale eroder 757 to construct a floating-point contrast map 760 of the facial area created or generated previously (e.g., by a in shape identifier 712). Since values in the contrast map 760 can vary from face to face, the values can be scaled by a scaler 763, such as between 0 and 255 for each face. Optionally, pixels can be skipped to speed up the mapping process.

The red eye reduction system 700 can also include a red eye detector 766 coupled to the mapping module 715. The red eye detector 766 can use the maps 725, 737, 760 generated in the mapping module 715 to determine if a red eye is present. By way of example only, the red eye detector 766 can start by making a Boolean contrast map 767 from the floating-point contrast map 760 in a contrast map converter 769. If a floating-point contrast entry in the floating-point contrast map 760 is greater than a predetermined threshold, a corresponding entry in the Boolean contrast map 767 can be labeled true. Otherwise, the entry can be labeled false in the Boolean contrast map 767. In some embodiments, the red eye reduction system 700 can then find if connected regions are present in the Boolean contrast map 767. When the red eye reduction system 700 has located connected regions, sizes and shapes of the connected regions can be determined. Based at least in part on the shape and the size of the connected regions found, the red eye reduction system 700 can determine if the connected regions are a red eye candidate at a candidate comparator 768. Unlikely candidates can be deleted.

In some embodiments, for each candidate region, the red eye reduction system 700 looks at the red eye map 737 and the distance map 725. If a candidacy comparator 768 determines a pixel value is the same in both the red eye map 737 and the distance map 725, the connected region can be considered a red eye. If the red eye reduction system 700 finds two eyes for a face, the red eye reduction system 700 can stop automatically. Otherwise, the red eye reduction system 700 can re-scale the floating-point contrast map 760 and repeat the above-described process, making another Boolean contrast map. After a red eye is located, a red eye remover 770 can automatically remove the red eye effect from the image.

Various features and advantages of the invention are set forth in the following claims.

The invention claimed is:

1. A method of reducing red eye effect from image data having image attributes, the image data corresponding to an image having at least one eye, the method comprising:
   identifying image data with a first image attribute having a characteristic of skin pixels;
   determining a shape of the identified image data having the first image attribute;
   mapping a plurality of other image attributes within the determined shape; and
   determining a red eye presence from the other mapped image attributes, comprising comparing the other mapped image attributes and determining red eye presence based upon the comparing; and
   modifying the image data, comprising reducing the determined red eye presence by finding a radius of the red eye pixels, making the pixels gray inside the radius and blending pixels between the radius and an extended radius so that the modified image data includes less red eye pixels than a number of red eye pixels in the image data prior to being modified.

2. The method of claim 1, wherein the first image attribute comprises at least one of a luminance, RGB triplets, Lab, and HSV.

3. The method of claim 1, further comprising determining if the first image attribute is inside a first image attribute boundary.

4. The method of claim 1, wherein identifying the image data with the first image attribute further comprises determining an elliptical area of the image data.

5. The method of claim 1, wherein determining the shape further comprises determining if the identified image data is connected.

6. The method of claim 5, further comprising comparing a number of pixels of the connected image data with a threshold.

7. The method of claim 5, wherein determining the shape further comprises solidifying the connected image data in the shape by filling gaps appearing in the shape with skin pixel data values.

8. The method of claim 1, wherein the shape comprises a rectangle.

9. The method of claim 1, wherein mapping image attributes further comprises determining a distance map between the image data and data having a neutral color.

10. The method of claim 9, further comprising equalizing the distance map.

11. The method of claim 9, further comprising comparing values of the distance map with a distance threshold.

12. The method of claim 1, wherein mapping image attributes further comprises determining a red eye map of the image data.

13. The method of claim 1, further comprising opening the image data in the shape.

14. The method of claim 1, wherein mapping image attributes further comprises determining a contrast map of the image data having characteristics of skin pixels.

15. The method of claim 14, further comprising rescaling values in the contrast map.

16. The method of claim 1, wherein the mapping comprises Boolean mapping the other mapped image attributes within the shape.

17. The method of claim 1, wherein the mapping creates more than two maps of the other image attributes, and determining red eye presence comprises favorably comparing each of the more than two maps.

18. A method of reducing red eye effect from image data having image attributes, the image data corresponding to an image having at least one eye, the method comprising:
comparing the image pixel data with data from a skin tone database;
identifying the image pixel data based upon a match between the image pixel data and the data from the skin tone database;
determining a shape of the identified image pixels;
locating at least one pixel having an image attribute in the determined shape;
comparing data of the located pixels with data from a plurality of red eye maps;
locating a red eye based on a match between the image data of the located pixels and the data from the red eye maps; and
modifying the image data, comprising reducing the located red eye in the image data by finding a radius of the located pixels, making the pixels gray inside the radius, and blending pixels between the radius and an extended radius, the image corresponding to the modified image data having at least one eye with less red than an amount of red appearing in the at least one eye of the image prior to the image data being modified.

19. The method of claim 18, wherein the data from the skin tone database comprises at least one of a luminance, RGB triplets, Lab, and HSV.

20. The method of claim 18, wherein identifying the image pixel data further comprises determining an elliptical area of the image data.

21. The method of claim 18, wherein determining the shape further comprises determining if the identified image pixel data is connected.

22. The method of claim 21, further comprising comparing a number of the connected image data with a threshold.

23. The method of claim 21, wherein determining the shape further comprises solidifying the connected image data in the shape by filling pixel gaps in the shape with one or more predetermined pixel values.

24. The method of claim 18, wherein the shape comprises a rectangle.

25. The method of claim 18, further comprising determining a distance map between the image pixel data and data having a neutral color, the distance map being one of the plurality of red eye maps.

26. The method of claim 25, further comprising equalizing the distance map.

27. The method of claim 25, further comprising comparing values of the distance map with a distance threshold.

28. The method of claim 18, further comprising opening the image data in the shape.

29. The method of claim 18, further comprising determining a contrast map of the image pixel data having characteristics of skin tones.

30. The method of claim 29, further comprising re-scaling the contrast map.

31. The method of claim 18, wherein the red eye maps are Boolean maps.

32. The method of claim 18, wherein the red eye maps comprise at least three maps.

33. A red eye reduction system adapted to reduce an red eye effect of an image, the system comprising:
a storage device to store the image;
a computing device communicatively coupled to the storage device to receive the stored image, the computing device having:
a skin tone identifier to identify image pixel data with a first image attribute having characteristics of skin pixels;
a shape identifier coupled to the skin tone identifier, to determine a shape of the identified image pixel data having characteristics of the skin pixels;
a mapping module coupled to the shape identifier, to map a plurality of other image attributes within the determined shape;
a red eye detector coupled to the mapping module, to determine a red eye presence from the plurality of other mapped image attributes; and
a red eye reducer to find a radius of the red eye pixels, make pixels inside the radius gray and blend pixels between the radius and an extended radius.

34. The system of claim 33, wherein the first image attribute comprises at least one of a luminance, RGB triplets, Lab, and HSV.

35. The system of claim 33, wherein the skin tone identifier determines if the first image attribute is inside a first image attribute boundary.

36. The system of claim 33, wherein the skin tone identifier determines an elliptical area of the image data.

37. The system of claim 33, wherein skin tone identifier determines if the identified image data is connected.

38. The system of claim 37, wherein the skin tone identifier compares a number of the connected image data with a threshold.

39. The system of claim 37, wherein the skin tone identifier solidifies the connected image data in the shape.

40. The system of claim 33, wherein the shape comprises a rectangle.

41. The system of claim 33, wherein the mapping module further comprises a distance mapping module to determine a distance map between the image data and data having a neutral color.

42. The system of claim 41, further comprising an equalizer to equalize the distance map.

43. The system of claim 41, wherein the mapping module compares values of the distance map with a distance threshold.

44. The system of claim 33, wherein the mapping module further comprises a red eye mapping module to map a plurality of red eye pixels of the image data.

45. The system of claim 33, further comprising opening the image data in the shape.

46. The system of claim 33, wherein the mapping module further comprises a contrast mapping module to determine a contrast map of the image data having characteristics of skin pixels.

47. The system of claim 33, wherein the mapping module creates Boolean maps.

48. The system of claim 33, wherein the red eye detector determines a red eye presence based upon at least three mapped image attributes.

49. A computer readable medium containing computer executable instructions for reducing red eye effect from image pixel data, which when executed by the computer, cause the computer to perform:
  identifying the image data with a first image attribute having characteristics of skin pixels;
  determining a shape of the identified image pixel data having characteristics of the skin pixels;
  mapping a plurality of other image attributes within the determined shape; and
  determining a red eye presence from the plurality of mapped image attributes; and
  reducing the determined red eye presence by finding a radius of the red eye pixels, making gray pixels inside the radius and blending pixels between the radius and an extended radius.

50. The computer readable medium of claim 49, wherein the first image attribute comprises at least one of a luminance, RGB triplets, Lab, and HSV.

51. The computer readable medium of claim 49, wherein the skin tone identifying software determines if the first image attribute is inside a first image attribute boundary.

52. The computer readable medium of claim 49, wherein the skin tone identifying software determines an elliptical area of the image data.

53. The computer readable medium of claim 49, wherein skin tone identifying software determines if the identified image data is connected.

54. The computer readable medium of claim 53, wherein the skin tone identifying software compares a number of the connected image data with a threshold.

55. The computer readable medium of claim 53, wherein the skin tone identifying software solidifies the connected image data in the shape.

56. The computer readable medium of claim 49, wherein the shape comprises a rectangle.

57. The computer readable medium of claim 49, wherein the mapping software further comprises a distance mapping software configured to determine a distance map between the image data and data having a neutral color.

58. The computer readable medium of claim 57, further comprising an equalizing software configured to equalize the distance map.

59. The computer readable medium of claim 57, wherein the mapping software compares values of the distance map with a distance threshold.

60. The computer readable medium of claim 49, wherein the mapping software further comprises a red eye mapping software configured to map a plurality of red eye pixels of the image data.

61. The apparatus of claim 49, further comprising an opening software configured to open the image data in the shape.

62. The computer readable medium of claim 49, wherein the mapping software further comprises a contrast mapping software configured to determine a contrast map of the image data having characteristics of skin pixels.

63. The computer readable medium of claim 49, further comprising at least one of a digital camera, a video camera, a computer, and a printer.

* * * * *

UNITED STATES PATENT AND TRADEMARK OFFICE
CERTIFICATE OF CORRECTION

PATENT NO.       : 7,627,146 B2                                             Page 1 of 1
APPLICATION NO.  : 10/883121
DATED            : December 1, 2009
INVENTOR(S)      : Khageshwar Thakur It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1322 days.

Signed and Sealed this

Twenty-first Day of December, 2010

David J. Kappos
*Director of the United States Patent and Trademark Office*